(12) United States Patent
Yu et al.

(10) Patent No.: US 9,101,012 B2
(45) Date of Patent: Aug. 4, 2015

(54) LIGHT-EMITTING DIODE TUBE

(71) Applicant: PoeSen Electronic Co., LTD., Taipei (TW)

(72) Inventors: Chung-Hung Yu, New Taipei (TW); Chin-Tsai Liu, New Taipei (TW)

(73) Assignee: POESEN ELECTRONIC CO., LTD., Taipei (TW)

( * ) Notice: Subject to any disclaimer, the term of this patent is extended or adjusted under 35 U.S.C. 154(b) by 0 days.

(21) Appl. No.: 14/168,638

(22) Filed: Jan. 30, 2014

(65) Prior Publication Data

US 2014/0225519 A1    Aug. 14, 2014

(30) Foreign Application Priority Data

Feb. 8, 2013   (TW) .............................. 102203021 U

(51) Int. Cl.
*H05B 37/00* (2006.01)
*H05B 33/08* (2006.01)

(52) U.S. Cl.
CPC ........... *H05B 33/0809* (2013.01); *Y02B 20/386* (2013.01)

(58) Field of Classification Search
CPC ............. H05B 37/029; H05B 33/0827; H05B 33/0815; H05B 33/0803; H05B 33/0806; H05B 41/232; H05B 41/28; F21Y 2101/02; F21Y 2103/003; F21K 9/17; F21K 9/175; F21K 9/30; F21V 23/003; Y02B 20/386
USPC ............. 315/201, 216, 291, 294, 187, 200 R, 315/185 R, 209 R; 362/221, 249.02, 217.01, 362/260, 265

See application file for complete search history.

(56) References Cited

U.S. PATENT DOCUMENTS

| 8,025,423 | B2 * | 9/2011 | Hancock et al. | ......... 362/249.02 |
| 8,147,091 | B2 * | 4/2012 | Hsia et al. | ..................... 362/221 |
| 2012/0313540 | A1 * | 12/2012 | Lin et al. | ....................... 315/201 |

* cited by examiner

*Primary Examiner* — Haiss Philogene
(74) *Attorney, Agent, or Firm* — Birch Stewart Kolach & Birch, LLP

(57) ABSTRACT

A light-emitting diode (LED) tube is applied to a lamp holder with a ballast, and has a lighting module, a first control module and a second control module connected to two ends of the lighting module, and a harmonic elimination module connected to the first and second control modules and parallelly connected to the lighting module. Each of the first control module and the second control module has a simulation circuit unit and a rectification unit. Each of the simulation circuit units and the harmonic elimination module has a switching element. The first and second control modules adjust electrical signals from the ballast, and the harmonic elimination module eliminates harmonic waves generated by the ballast so that the lighting module is compatible with the ballast and is lit. Accordingly, the LED tube can be directly mounted on a fluorescent lamp holder with the lamp holder intact.

9 Claims, 3 Drawing Sheets

LIGHT-EMITTING DIODE TUBE

BACKGROUND OF THE INVENTION

1. Field of the Invention

The present invention relates to a light-emitting diode (LED) tube, and more particularly to an LED tube capable of being directly mounted on a fluorescent lamp holder with a ballast.

2. Description of the Related Art

Fluorescent lamps have long been prevailing lighting devices, which provide uniform, stable and wide-angle lighting. Each conventional fluorescent lamp has a ballast mounted on a fluorescent lamp holder. The ballast converts an external power into a high-frequency and high-voltage power to light up a fluorescent tube and continuously supplies a stable current to the fluorescent tube after the fluorescent tube is lit. However, the conventional fluorescent tubes have life cycles considerably short and roughly lasting from 3,000 hours to 4,000 hours, and have relatively low power factors, resulting in the issue of relatively high power consumption.

As a result, lighting industry and academia dedicate their time and effort to expand lighting applications with LED because of the advantages of LED in high efficiency, low power consumption, high reliability, fast response time and low failure rate. Lighting applications using LED have gradually migrated from initial directional indicators, such as status indicator lights, traffic lights or the like, to indoor lighting to replace existing fluorescent lamps as a latest trend of LED development.

LED lights differ from conventional fluorescent lights in structural and circuit design. Hence, LED tubes fail to be directly mounted on conventional fluorescent lamp holders. If LED tubes are intended for use in indoor lighting, original fluorescent lights must be totally removed and replaced by lamp holders dedicated to the LED tubes. Such necessity not only costs more time, effort and expenditure but also limits the market acceptance of LED lights.

SUMMARY OF THE INVENTION

An objective of the present invention is to provide a light-emitting diode (LED) tube capable of being directly mounted on a fluorescent lamp holder with a ballast.

To achieve the foregoing objective, the LED tube is applied to a lamp holder with a ballast and has a lighting module, a first control module, a second control module and a harmonic elimination module.

The lighting module has a first terminal, a second terminal and multiple LED elements. The second terminal is opposite to the first terminal.

The first control module is connected to the first terminal of the lighting module and has a first simulation circuit unit and a first rectification unit.

The first simulation circuit unit has a first capacitor, a first resistor and a first switching element. The first resistor is parallelly connected to the first capacitor. The first switching element is connected in series to the parallel-connected first capacitor and first resistor. The first rectification unit has a first input terminal and a first output terminal. The first input terminal is electrically connected to the first simulation circuit unit. The first output terminal is electrically connected to the first terminal of the lighting module.

The second control module is connected to the second terminal of the lighting module and has a second simulation circuit unit and a second rectification unit.

The second simulation circuit unit has a second capacitor, a second resistor and a second switching element. The second resistor is parallelly connected to the second capacitor. The second switching element is connected in series to the parallel-connected second capacitor and second resistor.

The second rectification unit has a second input terminal and a second output terminal. The second input terminal is electrically connected to the second simulation circuit unit. The second output terminal is electrically connected to the second terminal of the lighting module.

The harmonic elimination module is parallelly connected to the lighting module with two ends of the harmonic elimination module respectively and electrically connected to the first control module and the second control module, and has a third capacitor, a third resistor and a third switching element. The third resistor is parallelly connected to the third capacitor. The third switching element is electrically connected to the third capacitor and the third resistor.

Given the first control module and the second control module for simulating the generation of tube voltage of conventional fluorescent tubes and the first switching element and the second switching element for controlling the first control module and the second control module, the LED tube of the present invention can be compatible with inductive ballasts or electronic ballasts in conventional fluorescent lamp holders and converts electrical signals from the ballast into power to be received by the lighting module. Accordingly, the LED tube of the present invention can directly replace conventional fluorescent tubes without the need of changing any part of the conventional fluorescent lamp holders, thereby delivering a replaceable and cost-effective LED tube.

Other objectives, advantages and novel features of the invention will become more apparent from the following detailed description when taken in conjunction with the accompanying drawings.

DETAILED DESCRIPTION OF THE INVENTION

Figure 1:
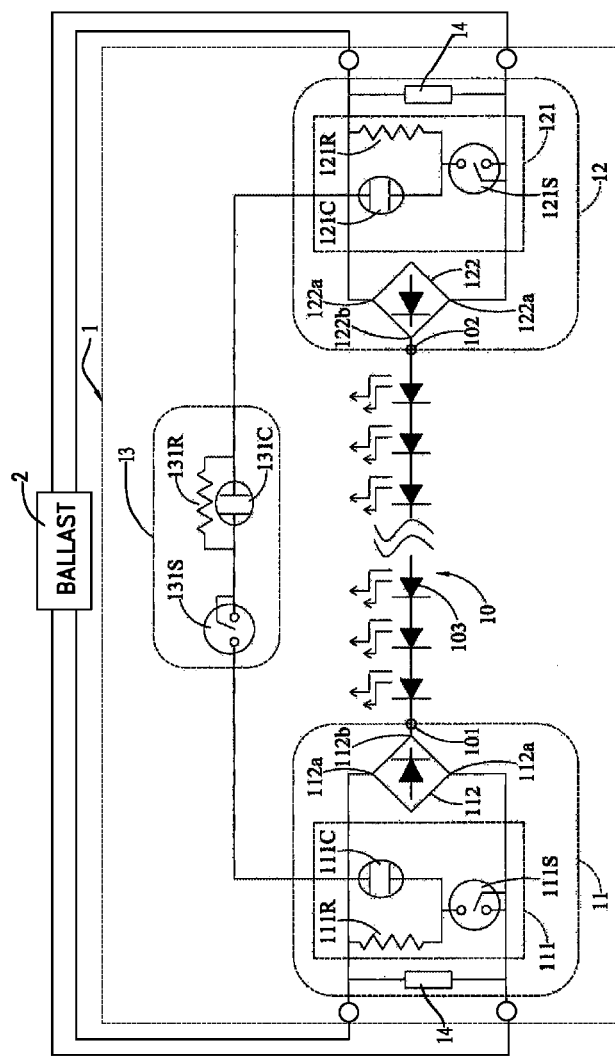
FIG. 1 is a circuit diagram of an LED tube in accordance with the present invention connected to a ballast of a fluorescent lamp.

With reference to FIG. 1, a light-emitting diode (LED) tube 1 in accordance with the present invention is electrically connected to a ballast 2 of a fluorescent lamp and is lit by an operating power outputted from the ballast 2. The LED tube 1 has a lighting module 10, a first control module 11, a second control module 12 and a harmonic elimination module 13. The ballast 2 may be an electronic ballast or an inductive ballast.

The lighting module 10 has a first terminal 101, a second terminal 102 opposite to the first terminal 101, and multiple LED elements 103.

The first control module 11 is connected to the first terminal 101 of the lighting module 10, and has a first simulation circuit unit 111 and a first rectification unit 112. The first simulation circuit unit 111 has a first capacitor 111C, a first resistor 111R and a first switching element 111S. The first capacitor 111C and the first resistor 111R are parallelly connected. The first switching element 111S is connected in series to the parallel-connected first capacitor 111C and first resistor 111R. The first rectification unit 112 has a first input terminal 112a and a first output terminal 112b. The first input terminal 112a is electrically connected to the first simulation circuit unit 111. The first output terminal 112b is electrically connected to the first terminal 101 of the lighting module 10. The second control module 12 is connected to the second terminal 102 of the lighting module 10, and has a second simulation circuit unit 121 and a second rectification unit 122. The second simulation circuit unit 121 has a second capacitor 121C, a second resistor 121R and a second switching element 121S. The second capacitor 121C and the second resistor 121R are parallelly connected. The second switching element 121S is connected in series to the parallel-connected second capacitor 121C and second resistor 121R. The second rectification unit 122 has a second input terminal 122a and a second output terminal 122b. The second input terminal 122a is electrically connected to the second simulation circuit unit 121. The second output terminal 122b is electrically connected to the second terminal 102 of the lighting module 10.

Each of the first rectification unit 112 and the second rectification unit 122 is a bridge rectifier or a semiconductor for converting AC voltage outputted from the ballast 2 into DC voltage.

The first and second capacitors 111C, 121C and the first and second resistors 111R, 121R in the first simulation circuit unit 111 and the second simulation circuit unit 121 are used to simulate generation of tube voltage of conventional fluorescent tubes so as to be compatible with the ballasts in the conventional fluorescent tubes and fulfill functions of the ballasts in detecting tube voltage, filament resistance, multi-stage pre-heating states of tube, multi-stage wattage and the like.

The harmonic elimination module 13 has a third capacitor 131C, a third resistor 131R and a third switching element 131S. The third capacitor 131C and the third resistor 131R are parallelly connected. The third switching element 131S is electrically connected to the third capacitor 131C and the third resistor 131R. Two ends of the harmonic elimination module 13 are respectively and electrically connected to the first control module 11 and the second control module 12, and are parallelly connected to the lighting module 10.

Figure 2:
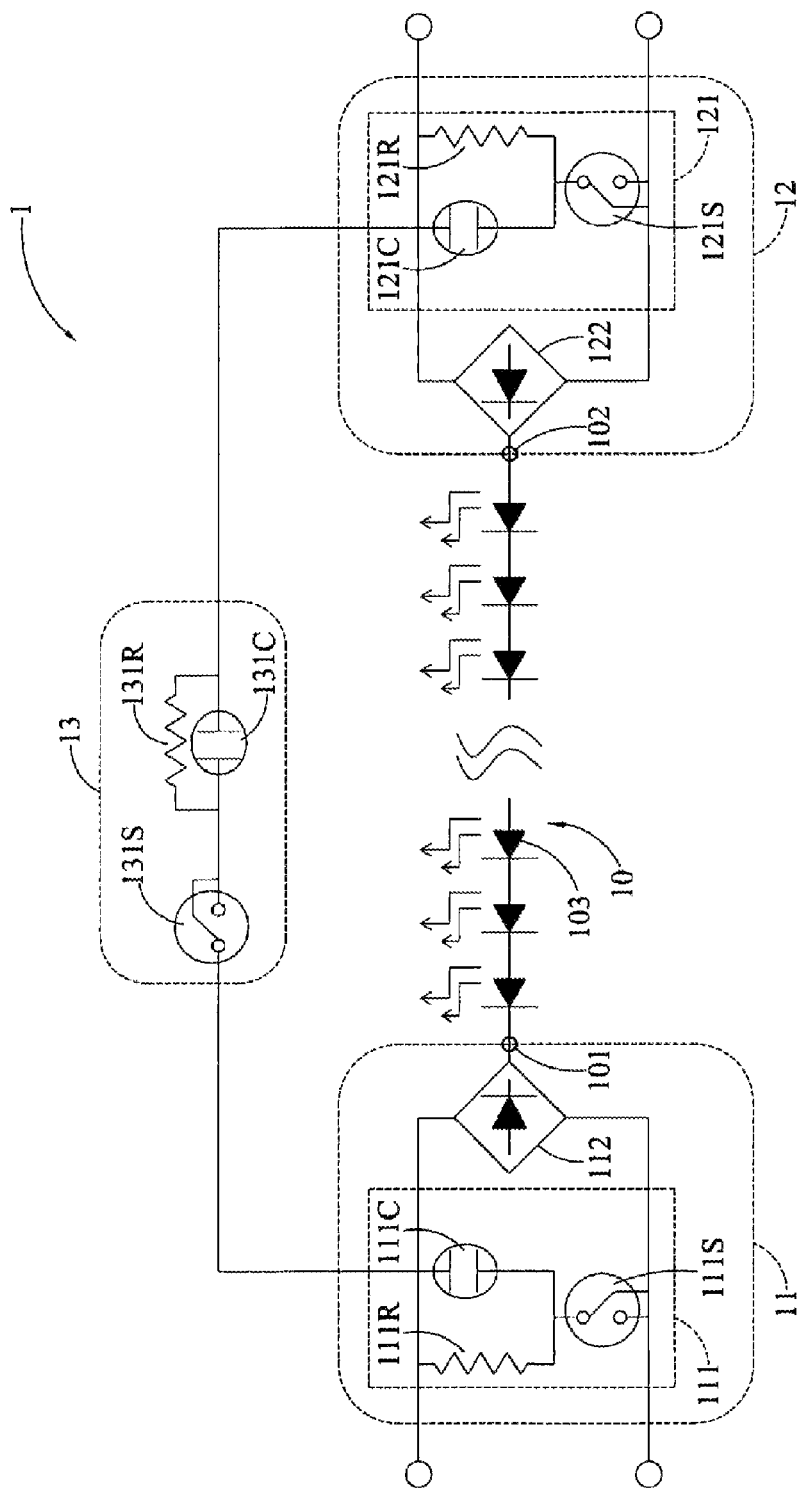
FIG. 2 is a circuit diagram of the LED tube in FIG. 1 with a switching element of the LED tube operated in a short-circuit state.

With reference to FIG. 2, when the ballast 2 is an electronic ballast, the first switching element 111S, the second switching element 121S and the third switching element 131S are switched in a short-circuited state. The first control module 11 and the second control module 12 adjust electrical signals from the ballast 2 for the lighting module 10 to be lit after receiving the adjusted electrical signals. The harmonic elimination module 13 serves to eliminate harmonic waves generated by self-excited oscillation of the ballast 2. The LED elements 103 are mutually connected in series so as to be compatible with the ballast 2.

Figure 3:
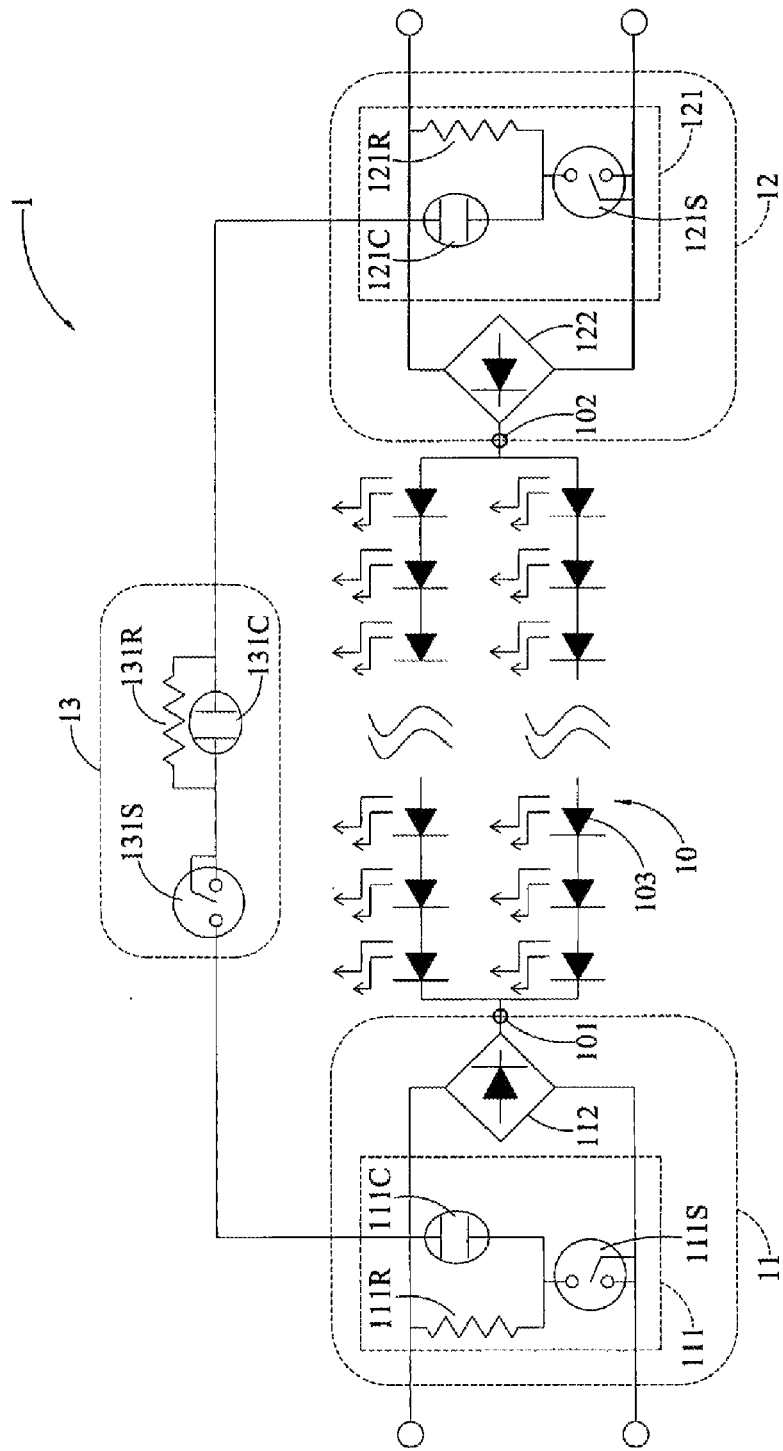
FIG. 3 is a circuit diagram of the LED tube in FIG. 1 with a switching element of the LED tube operated in an open-circuit state.

With reference to FIG. 3, when the ballast 2 is an inductive ballast, the first switching element 111S, the second switching element 121S and the third switching element 131S are switched in an open-circuited state. The first control module 11 and the second control module 12 adjust electrical signals from the ballast 2 for the lighting module 10 to be lit after receiving the adjusted electrical signals. The LED elements 103 are mutually connected in parallel so as to be compatible with the ballast 2.

Each of the first switching element 111S, the second switching element 121S and the third switching elements 131S may be a mechanical switch or an electronic switch.

With further reference to FIG. 1, each of the first control module 11 and the second control module 12 further has a detection circuit 14. The detection circuit 14 is parallelly connected to one of the first rectification unit 112 and the second rectification unit 122, detects an operating frequency of the ballast 2, and switches the first switching element 111S, the second switching element 121S and the third switching element 131S to be in the open-circuited state or the short-circuited state according to the detected operating frequency. The first switching element 111S, the second switching element 121S and the third switching element 131S are jointly switched to the open-circuited state or the short-circuited state. The operating frequency of the inductive ballast is approximately at 60 Hz, and the operating frequency of the electronic ballast is approximately in a range of 20-50 Hz.

What is worth mentioning is that despite the availability of the first control module 11 and the second control module 12 in the LED tube 1, any one of the first control module 11 and the second control module 12 can adjust the electrical signal of the ballast 2 and sends the adjusted electrical signal to the lighting module 10. In other words, even though one of the first control module 11 and the second control module 12 is faulty, the other one of the first control module 11 and the second control module 12 can take over the adjustment of the electrical signal.

In sum, given the first simulation circuit unit and the second simulation circuit unit of the first control module and the second control module for simulating the generation of tube voltage of conventional fluorescent tubes and the first switching element and the second switching element for controlling the first control module and the second control module, the LED tube of the present invention can be compatible with inductive ballasts or electronic ballasts in conventional fluorescent lamp holders. Accordingly, the LED tube of the present invention can directly replace conventional fluorescent tubes without the need of changing any part of the conventional fluorescent lamp holders, thereby delivering a power-saving, environment-friendly and durable LED tube that can be widely accepted.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A light-emitting diode (LED) tube applied to a lamp holder with a ballast, the LED tube comprising:
   a lighting module having:
      a first terminal;
      a second terminal opposite to the first terminal; and
      multiple LED elements;
   a first control module connected to the first terminal of the lighting module and having:
      a first simulation circuit unit having:
         a first capacitor;
         a first resistor parallelly connected to the first capacitor; and
         a first switching element connected in series to the parallel-connected first capacitor and first resistor; and
      a first rectification unit having:
         a first input terminal electrically connected to the first simulation circuit unit; and a first output terminal electrically connected to the first terminal of the lighting module;
a second control module connected to the second terminal of the lighting module and having:
a second simulation circuit unit having:
a second capacitor;
a second resistor parallelly connected to the second capacitor; and
a second switching element electrically connected to the second capacitor and the second resistor; and
a second rectification unit having:
a second input terminal electrically connected to the second simulation circuit unit; and
a second output terminal electrically connected to the second terminal of the lighting module; and
a harmonic elimination module parallelly connected to the lighting module with two ends of the harmonic elimination module respectively and electrically connected to the first control module and the second control module, and having:
a third capacitor;
a third resistor parallelly connected to the third capacitor; and
a third switching element connected in series to the parallel-connected third capacitor and the third resistor.

2. The LED tube as claimed in claim 1, wherein when the ballast is an electronic ballast, the first switching element, the second switching element and the third switching element are switched in a short-circuited state, the first control module and the second control module adjust electrical signals from the ballast for the lighting module to be lit after receiving the adjusted electrical signal, and the harmonic elimination module serves to eliminate harmonic waves generated by self-excited oscillation of the ballast.

3. The LED tube as claimed in claim 2, wherein the LED elements are connected in series so as to be compatible with the electronic ballast.

4. The LED tube as claimed in claim 1, wherein when the ballast is an inductive ballast, the first switching element, the second switching element and the third switching element are switched in an open-circuited state, and the first control module and the second control module adjust electrical signals from the ballast for the lighting module to be lit after receiving the adjusted electrical signals.

5. The LED tube as claimed in claim 4, wherein the LED elements are mutually connected in parallel so as to be compatible with the ballast.

6. The LED tube as claimed in claim 1, wherein the first control module further has a detection circuit, parallelly connected to the first rectification unit, detecting an operating frequency of the ballast, and switching the first switching element, the second switching element and the third switching element to be in an open-circuited state or a short-circuited state according to the detected operating frequency.

7. The LED tube as claimed in claim 1, wherein the second control module further has a detection circuit, parallelly connected to the second rectification unit, detecting an operating frequency of the ballast, and switching the first switching element, the second switching element and the third switching element to be in an open-circuited state or a short-circuited state according to the detected operating frequency.

8. The LED tube as claimed in claim 1, wherein the first switching element, the second switching element and the third switching element are jointly switched to an open-circuited state or a short-circuited state.

9. The LED tube as claimed in claim 1, wherein each of the first switching element, the second switching element and the third switching elements is a mechanical switch or an electronic switch.

* * * * *